Patented Jan. 26, 1926.

1,571,084

UNITED STATES PATENT OFFICE.

WILLIAM CLYDE BASSETT, OF LONG BEACH, CALIFORNIA.

COMPOSITION FOR CASEHARDENING.

No Drawing.  Application filed May 14, 1925. Serial No. 30,364.

*To all whom it may concern:*

Be it known that I, WILLIAM CLYDE BASSETT, a citizen of the United States, residing at Long Beach, California, in the county of Los Angeles and State of California, have invented new and useful Improvements in Composition for Casehardening, of which the following is a specification.

The present invention relates to a composition for case hardening steel and the like, and constitutes an improvement on the composition described and claimed in my U. S. Patent No. 1,499,285.

In the said prior patent a composition is described, consisting essentially of wood charcoal, preferably hard wood charcoal, together with hard wood sawdust, sodium carbonate and magnesium carbonate.

While such composition gives very satisfactory results, I find that it is possible in some cases to secure better results, by omitting the magnesium carbonate and also by substituting sodium bicarbonate instead of sodium carbonate.

A further modification of the process involves the substitution of charcoal in place of the sawdust, and in this case I preferably employ the charcoal in a somewhat granular condition rather than in the form of a fine powder. Ordinarily however I prefer to use both charcoal and sawdust in the composition, together with sadium bicarbonate, and also I may employ magnesium carbonate in conjunction therewith if desired, although for most purposes I omit the latter component.

I am aware that compositions have heretofore been proposed, including sulphur and salts of sulphuric acid, in case hardening, but such compositions are found to give very unsatisfactory results for hardening in many cases, because the sulphur combines with the iron and produces a brittle and relatively soft material which flakes badly. This applies whether the sulphur is employed in the elemental condition or in the form of sulphates. Accordingly I omit sulphur entirely from the composition, as well as sulphur compounds.

In its preferred form the composition consists essentially of 12 parts of fine sawdust, preferably hard wood sawdust, together with 8 parts of charcoal which may be either coarse or fine, and 1 part of sodium bicarbonate. These components can be mixed together if desired, or in some cases it is advisable to form a solution or suspension of the bicarbonate in water, which is mixed with the sawdust or with the mixture of sawdust and granular charcoal, and this mixture is then subsequently dried, before used. In case I substitute granular charcoal in place of the sawdust, it is always advisable to apply the sodium bicarbonate thereto in the form of a solution or suspension, otherwise there is a considerable likelihood of segregation of the fine powder of sodium bicarbonate, from the granular charcoal, which of course is to be avoided.

The use of sodium bicarbonate, in place of sodium carbonate is a distinct advance in the art, because by the means of sodium bicarbonate the carbon carburizing action takes place more rapidly, perhaps due to the fact that upon heating the sodium bicarbonate, a portion of the carbon dioxide content is given off in the form of gas, which reacts with the solid carbon present to form a much higher concentration of carbon monoxide in the box or receptacle in which the case hardening is carried out, by means of which the case hardening is accelerated. Sodium carbonate and sodium bicarbonate, used under the same conditions of heat will give about the same degree of hardness to the surface of the steel articles, but the hardened surface seems to be somewhat less brittle when using sodium bicarbonate, so that the hard surface does not chip off so readily. This is of very great advantage in the case of gears or the like which are to be case hardened.

The presence of magnesium carbonate, either with sodium carbonate or with sodium bicarbonate tends to produce more or less brittleness of the case hardened surface, which is avoided in accordance with the present invention, in which magnesium carbonate is preferably omitted from the mixture or composition.

As is customary in the case hardening operation, the pieces of steel to be hardened are placed into boxes or pipes, preferably in alternate layers with the above described composition, although it is immaterial if one piece of steel happens to actually touch another piece, since no injury to the steel pieces is produced thereby. The boxes thus packed are preferably covered and are placed in a furnace and are heated to a temperature at which case hardening is effected, say about 1600 to 1750° F., depending upon the degree of hardness and the thickness of the case desired.

A particular advantage of the use of my present composition is that it takes a shorter time to do the work, saving about one fourth of the time which would be required with a good many of the compositions heretofore employed. The compound, being free from sulphur, does not put any sulphur into the steel, but has a tendency to purify the steel particularly the outer layer or the case. The composition can be used over many times without losing its efficiency or strength, and if desired a very thick case can be produced, by protractive heating. When it is desired to use the compound over many times, it is advisable to add some fresh material to the same from time to time, to make up for loses and to keep the composition highly active. It is possible when using this compound to give a case having 1.1 to 1.2% of carbon, giving a higher grade casing then other compounds heretofore proposed for the purpose.

In view of the substitution of sodium bicarbonate, and in view of the omission of the magnesium carbonate, the composition is cheaper to manufacture than the composition of my prior patent.

I claim:—

1. A composition for use in case hardening steel comprising solid carbonaceous material and a bicarbonate of an alkali metal, the latter being present in amount representing a few percent only of the entire mixture, such composition being substantially free from sulfur.

2. A composition for use in case hardening steel comprising solid carbonaceous material and sodium bicarbonate, the latter being present in amount representing a few per cent only of the entire mixture, such composition being substantially free from sulfur.

3. A composition for use in case hardening steel comprising solid carbonaceous material and a bicarbonate of an alkali metal and magnesium carbonate, the two latter, together being present in amount representing a few percent only of the entire mixture, such composition being substantially free from sulfur.

4. A composition for use in case hardening, comprising fine sawdust, as the major component, charcoal in substantially smaller amount, and sodium bicarbonate in still smaller amount, the latter component amounting to substantially about 4 to 7% of the mixture, such product being free from sulfur.

5. A composition for use in case hardening, comprising fine sawdust about 12 parts, charcoal about 8 parts, sodium bicarbonate 1 part, such composition being substantially free from sulfur both free and combined.

In testimony whereof I affix my signature.

WILLIAM CLYDE BASSETT.